US012545233B2

(12) United States Patent
Umemura et al.

(10) Patent No.: US 12,545,233 B2
(45) Date of Patent: Feb. 10, 2026

(54) HYBRID VEHICLE DECELERATION UTILIZING FUEL CUT AND INCREASE IN ENGINE ROTATIONAL SPEED

(71) Applicant: TOYOTA JIDOSHA KABUSHIKI KAISHA, Toyota (JP)

(72) Inventors: Yoshihisa Umemura, Toyota (JP); Suguru Kumazawa, Toyota (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 18/464,708

(22) Filed: Sep. 11, 2023

(65) Prior Publication Data
US 2024/0149865 A1 May 9, 2024

(30) Foreign Application Priority Data
Nov. 9, 2022 (JP) .................................. 2022-179632

(51) Int. Cl.
B60W 20/40 (2016.01)
B60W 10/06 (2006.01)
B60W 10/08 (2006.01)
B60W 20/15 (2016.01)

(52) U.S. Cl.
CPC ............ *B60W 20/40* (2013.01); *B60W 10/06* (2013.01); *B60W 10/08* (2013.01); *B60W 20/15* (2016.01); *B60W 2510/068* (2013.01); *B60W 2510/244* (2013.01); *B60W 2710/0644* (2013.01)

(58) Field of Classification Search
CPC ...... B60W 20/40; B60W 10/06; B60W 10/08; B60W 20/15; B60W 2510/068; B60W 2510/244; B60W 2710/0644; B60W 20/00; B60W 20/30; B60W 20/16; B60W 20/13; Y02T 10/62; B60K 6/22
See application file for complete search history.

(56) References Cited

U.S. PATENT DOCUMENTS

2009/0227409 A1* 9/2009 Ito .......................... B60W 10/08
477/3
2021/0162983 A1* 6/2021 Ariyoshi ............... B60W 10/26

FOREIGN PATENT DOCUMENTS

JP 2017-128152 A 7/2017

* cited by examiner

Primary Examiner — Brian P Sweeney
(74) Attorney, Agent, or Firm — Oblon, McClelland, Maier & Neustadt, L.L.P.

(57) ABSTRACT

The hybrid vehicle includes an engine coupled to a drive shaft, a first motor that rotates the engine a second motor coupled to the drive shaft, a transmission interposed between the engine and the first motor, and the second motor, and a control device configured to execute a decrease process and an increase process. The decrease process is a process for decreasing deceleration of the hybrid vehicle by restricting fuel cut in the engine. The increase process is a process for increasing a rotational speed of the engine to a target rotational speed by power running torque of the first motor during deceleration by downshift of the transmission. The target rotational speed in the increase process is set to a lower value during execution of the decrease process than during stop of the decrease process.

4 Claims, 5 Drawing Sheets

HYBRID VEHICLE DECELERATION UTILIZING FUEL CUT AND INCREASE IN ENGINE ROTATIONAL SPEED

CROSS-REFERENCE TO RELATED APPLICATION

This application is based upon and claims the benefit of priority of the prior Japanese Patent Application No. 2022-179632, filed on Nov. 9, 2022, the entire contents of which are incorporated herein by reference.

TECHNICAL FIELD

The present disclosure relates to a hybrid vehicle.

BACKGROUND

In a hybrid vehicle including a first motor and a second motor, decrease process for decreasing deceleration of the hybrid vehicle may be executed by restricting fuel cut in an engine (see, for example, Japanese Unexamined Patent Application Publication No. 2017-128152).

When the fuel cut is restricted as described above, it is conceivable that the same deceleration as that in the case where the fuel cut is executed is ensured by the power running torque of the first motor. In this case, the rotational speed of the first motor might become excessively high. As a result, the power consumption of the first motor might increases and the power consumption in the vehicle might increase.

Further, at the time of deceleration due to downshift in the hybrid vehicle, it is conceivable to execute an increase process for increasing the engine rotational speed to the target rotational speed by the power running torque of the first motor while ensuring the deceleration of the vehicle caused by fuel cut in the engine. If the increase process is executed during the execution of the decrease process described above, the power consumption of the first motor might increase and the power consumption of the vehicle might increase.

SUMMARY

It is therefore an object of the present disclosure to provide a hybrid vehicle in which an increase in electric power consumption is suppressed.

The above object is achieved by a hybrid vehicle including: an engine coupled to a drive shaft; a first motor that rotates the engine; a second motor coupled to the drive shaft; a transmission interposed between the engine and the first motor, and the second motor; and a control device configured to execute a decrease process and an increase process, wherein the decrease process is a process for decreasing deceleration of the hybrid vehicle by restricting fuel cut in the engine, the increase process is a process for increasing a rotational speed of the engine to a target rotational speed by power running torque of the first motor during deceleration by downshift of the transmission, and the target rotational speed in the increase process is set to a lower value during execution of the decrease process than during stop of the decrease process.

A battery that supplies electric power to the first motor may be included, wherein the target rotational speed in the increase process may be set to a lower value as a charge amount of the battery is lower.

The target rotational speed in the increase process may be set to a lower value as a temperature of a coolant of the engine is lower.

The decrease process may restrict the fuel cut when it is predicted that the temperature of a filter that collects particulate matter in exhaust gas of the engine excessively rises due to execution of the fuel cut.

DETAILED DESCRIPTION

[Schematic Configuration of Hybrid Vehicle]

Figure 1:
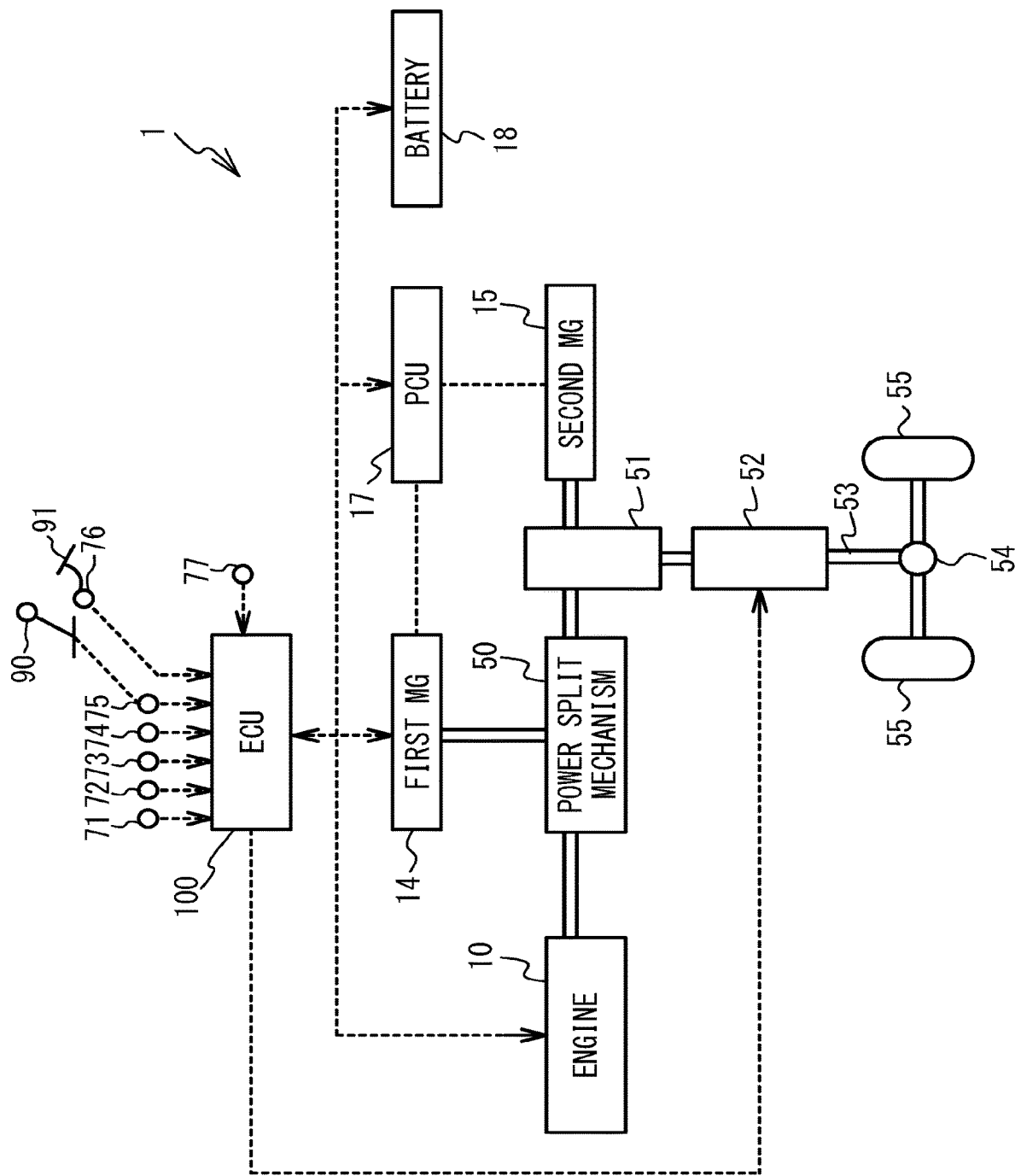
FIG. 1 is a schematic configuration view of a hybrid vehicle.

FIG. 1 is a schematic configuration view of a hybrid vehicle 1 according to the present embodiment. The hybrid vehicle 1 includes an Electronic Control Unit (ECU) 100, an engine 10, a first motor generator (hereinafter referred to as "first MG") 14, a second motor generator (hereinafter referred to as "second MG") 15, a Power Control Unit (PCU) 17, a battery 18, a power split mechanism 50, a transmitting mechanism 51, a transmission 52, a drive shaft 53, a differential gear 54, and drive wheels 55. The engine 10 is a gasoline engine, but is not limited thereto, and may be a diesel engine. The engine 10, the first MG 14, and the second MG 15 are power sources for traveling of the hybrid vehicle 1.

Both of the first MG 14 and the second MG 15 function as motors that output torque by being supplied with driving power. Both of the first MG 14 and the second MG 15 also function as power generators that generate regenerative electric power when torque is applied thereto. Specifically, the first MG 14 and the second MG 15 are AC rotary electric machines. The AC rotary electric machine is, for example, a permanent magnet type synchronous motor including a rotor in which permanent magnets are embedded.

The first MG 14 and the second MG 15 are electrically connected to the battery 18 via the PCU 17. The PCU 17 includes a first inverter that exchanges electric power with the first MG 14, a second inverter that exchanges electric power with the second MG 15, and a converter. The converter boosts the electric power of the battery 18 and supplies the boosted electric power to the first and second inverters. The converter lowers electric power supplied from the first and second inverters and supplies the lowered electric power to the battery 18. The first invertor converts DC power from the converter into AC power and supplies the AC power to the first MG 14. The first invertor converts AC power from the first MG 14 into DC power and supplies the DC power to the converter. The second inverter converts DC power from the converter into AC power and supply the AC power to the second MG 15. The second inverter converts AC power from the second MG 15 into DC power and supply the DC power to the converter. That is, the battery 18 supplies electric power to the first MG 14 or the second MG 15. The battery 18 receives regenerative electric power generated in the first MG 14 or the second MG 15.

The ECU 100 controls the first inverter to control the amount of electric power supplied to the first MG 14 and the amount of regenerative electric power in the first MG 14. In this way, the ECU 100 controls the power running torque and the regenerative torque of the first MG 14. Similarly, the ECU 100 controls the second inverter to control the amount of electric power supplied to the second MG 15 and the amount of regenerative electric power in the second MG 15. In this way, the ECU 100 controls the power running torque and the regenerative torque of the second MG 15.

The battery 18 includes stacked cells. The battery is, for example, a secondary battery such as a nickel-hydrogen battery or a lithium-ion battery.

The power split mechanism 50 mechanically couples the crankshaft of the engine 10, the rotational shaft of the first MG 14, and an output shaft of the power split mechanism 50. The power split mechanism 50 is, for example, a planetary gear mechanism including a sun gear, a planetary carrier, a pinion gear, and a ring gear. The rotor of the first MG 14 is coupled to the sun gear. The drive shaft 53 is coupled to the ring gear via the transmitting mechanism 51 and the transmission 52. A crankshaft of the engine 10 is coupled to the planetary carrier to which the pinion gear is coupled. The output shaft of the power split mechanism 50 is coupled to the transmitting mechanism 51. The rotational shaft of the second MG 15 is also coupled to the transmitting mechanism 51. The transmitting mechanism 51 is coupled to the transmission 52. The transmission 52 is coupled to the drive shaft 53. The driving forces of the engine 10, the first MG 14, and the second MG 15 are transmitted to the drive wheels 55 via the transmitting mechanism 51, the transmission 52, the drive shaft 53, and the differential gear 54.

The transmission 52 is interposed between the second MG 15 and the drive shaft 53. The transmission 52 changes a transmission ratio by changing the gear ratio controlled by the ECU 100. The transmission 52 is a stepped automatic transmission. The transmission 52 switches power transmission states. The power transmission states include an neutral (N) range, a drive (D) range, a reverse (R) range, and a parking (P) range. In the N range, power transmission to the drive wheels 55 is cut off. In the D range, forward traveling is possible. In the R range, backward traveling is possible. In the P range, power transmission to the drive wheels 55 is cut off and rotation of the output shaft of the transmission 52 is mechanically prevented. The range of the transmission 52 is switched by manual operation of a shift lever 90 by a driver.

The ECU 100 is an electronic control unit that includes an arithmetic process circuit that performs various types of arithmetic process related to travel control of the vehicles and a memory that stores control programs and data. The ECU 100 is an example of a control device.

Signals from an ignition switch 71, a water temperature sensor 72, a crank angle sensor 73, an air flow meter 74, a shift position sensor 75, an accelerator opening degree sensor 76, and a state of charge (SOC) sensor 77 are input to the ECU 100. The ignition switch 71 detects the ON/OFF state of the ignition. The water temperature sensor 72 detects the temperature of the coolant of the engine 10. The crank angle sensor 73 detects an engine rotational speed that is a rotational speed of a crankshaft of the engine 10. The air flow meter 74 detects the amount of intake air introduced into the engine 10. The shift position sensor 75 detects an operation position of the shift lever 90. The accelerator opening degree sensor 76 detects an operation position of an accelerator pedal 91. The SOC sensor 77 detects a charge amount of the battery 18.

The ECU 100 controls the accelerations and decelerations based on an accelerator operation amount. Specifically, the outputs of the engine 10, the first MG 14, and the second MG 15 are controlled so as to achieve target accelerations or target decelerations set based on the accelerator operation amount. The output of the engine is controlled by an intake air amount and a fuel injection amount. Each output of the first MG 14 and the second MG 15 is controlled by the PCU 17.

[Schematic Configuration of Engine]

Figure 2:
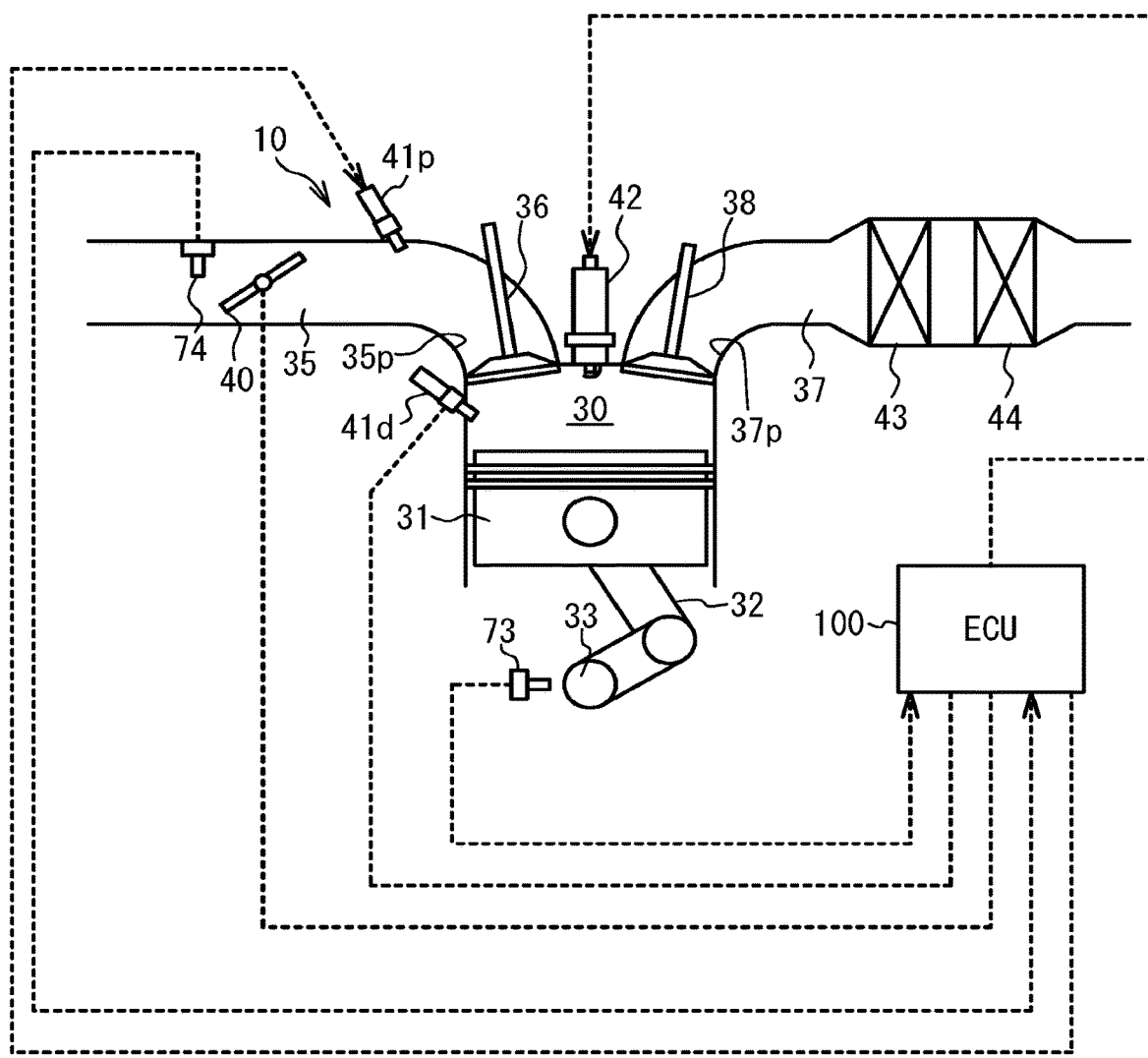
FIG. 2 is a schematic configuration view of an engine.

FIG. 2 is a schematic configuration view of the engine 10. The engine 10 includes cylinders 30, pistons 31, connecting rods 32, a crankshaft 33, an intake passage 35, intake valves 36, an exhaust passage 37, and exhaust valves 38. In FIG. 2, only one of the cylinders 30 included in the engine 10 is illustrated. The air-fuel mixture is burned in the cylinder 30. The piston 31 is reciprocatably accommodated in each cylinder 30, and is coupled to the crankshaft 33, which is an output shaft of the engine 10, via the connecting rod 32. The connecting rod 32 and the crankshaft 33 convert the reciprocating motion of the piston 31 into rotational motion of the crankshaft 33.

The cylinder 30 is provided with an in-cylinder injector 41$d$. The in-cylinder injector 41$d$ injects fuel directly into the cylinder 30. The intake passage 35 is provided with a port injector 41$p$ that injects fuel toward the intake port 35$p$. Each of the cylinders 30 is provided with an ignition apparatus 42. The ignition apparatus 42 ignites an air-fuel mixture of intake air introduced through the intake passage 35 and fuel injected by the in-cylinder injector 41$d$ and the port injector 41$p$, by spark discharge. Note that at least one of the in-cylinder injector 41$d$ and the port injector 41$p$ may be provided.

The intake passage 35 is connected to each intake port 35$p$ of the cylinders 30 via each intake valve 36. The exhaust passage 37 is connected to each exhaust port 37$p$ of the cylinders 30 via each exhaust valve 38. The air flow meter 74 described above, and a throttle valve 40 that controls the intake air amount are provided in the intake passage 35.

A three way catalyst 43 and a Gasoline Particulate Filter (GPF) 44 are provided in the exhaust passage 37 from the upstream side. The three way catalyst 43 contains, for example, a catalytic metal such as platinum (Pt), palladium (Pd), or rhodium (Rh), has oxygen storage capacity, and purifies NOx, HC, and CO.

The GPF 44 is a porous-ceramic structure and collects exhaust particulates (hereinafter referred to as PM (Particulate Matter)) in exhaust gas. Further, a noble metal such as platinum is carried on the GPF 44. During the regeneration control, the noble metal promotes the oxidation reaction of the deposited PM. The GPF 44 is an example of a filter. For example, when the engine 10 is a diesel engine, a diesel particulate filter (DPF) is provided instead of the GPF 44.

The throttle valve 40 increases or decreases the amount of intake air introduced into the cylinders 30 by increasing or decreasing an opening degree of the throttle valve 40. The opening degree of the throttle valve 40 is controlled in accordance with a required opening degree from the ECU 100.

When the accelerator is turned off while the engine 10 is driven and the hybrid vehicle 1 is traveling, the ECU 100 executes fuel cut for stopping fuel injection from the in-cylinder injectors 41$d$ and the port injectors 41$p$ of the engine 10. As a result, the output torque of the engine 10 becomes a negative value, and the hybrid vehicle 1 decelerates. During execution of the fuel cut, air (oxygen) is supplied to the GPF 44, and the PM deposited on the GPF 44 is burned.

[Decrease Process]

The ECU 100 executes decrease process when a predetermined condition is satisfied. The decrease process is a process for decreasing the deceleration of the hybrid vehicle 1 by restricting the fuel cut.

The predetermined condition is a case where it is predicted that a temperature of the GPF 44 will excessively rise due to execution of the fuel cut. By restricting the fuel cut in such a predicted case, it is possible to suppress an excessive temperature rise of the GPF 44. The ECU 100 predicts whether or not the temperature of the GPF 44 excessively rises due to the execution of the fuel cut based on a PM deposition amount in the GPF 44 and the temperature of the GPF 44. As the PM deposition amount increases and as the temperature of the GPF 44 increases, it is predicted that the temperature of the GPF 44 excessively rises due to the execution of the fuel cut.

The PM deposition amount in the GPF 44 is calculated based on, for example, the engine rotational speed, the charging efficiency, and the temperature of the coolant. The charging efficiency is calculated based on the engine rotational speed and the intake air amount. The engine rotational speed is calculated based on the detection value of the crank angle sensor 73. The intake air amount is calculated based on the detection value of the air flow meter 74. The temperature of the coolant is calculated based on the detection value of the water temperature sensor 72.

The temperature of the GPF 44 is calculated based on, for example, the engine rotational speed and the charging efficiency. However, the method of calculating the PM deposition amount in the GPF 44 and the temperature of the GPF 44 is not limited to this. For example, the PM deposition amount may be calculated based on a difference between pressures before and after the GPF 44. The temperature of the GPF 44 may be calculated based on the detection values of the temperature sensors. Also, they may be calculated by a known method.

[Engine Rotational Speed Increase Control]

Figure 3:
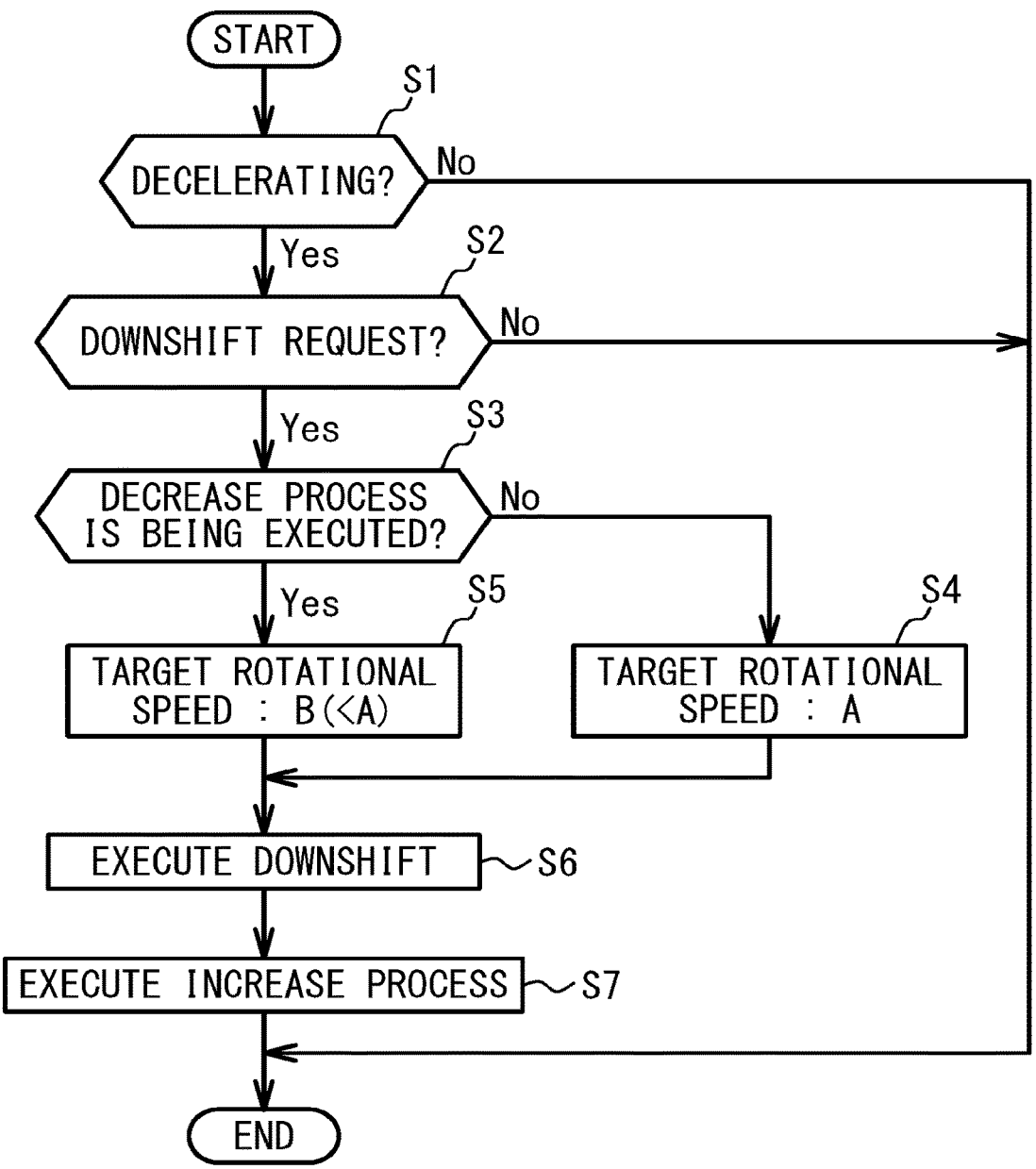
FIG. 3 is a flowchart illustrating an example of engine rotational speed increase control.

FIG. 3 is a flowchart illustrating an example of engine rotational speed increase control executed by the ECU 100. This control is repeatedly executed at predetermined intervals in a state where the ignition is on. First, the ECU 100 determines whether or not the hybrid vehicle 1 is decelerating based on, for example, the operation position of the accelerator pedal 91 (step S1). In the case of No in step S1, this control ends. In the case of Yes in step S1, the ECU 100 determines whether or not there is a downshift request of the transmission 52 (step S2). In the case of No in step S2, this control ends.

In the case of Yes in step S2, the ECU 100 determines whether or not the above-described decrease process is being executed (step S3). In the case of No in step S3, the ECU 100 sets the target rotational speed of the engine 10 to a rotational speed A (step S4). The ECU 100 executes the downshift (step S6). The ECU 100 executes an increase process for increasing the engine rotational speed to the rotational speed A (step S7). In this case, the engine rotational speed is increased to the rotational speed A by the power running operation in the first MG 14 while executing the fuel cut.

In the case of Yes in step S3, the ECU 100 sets the target rotational speed of the engine 10 to a rotational speed B that is lower than the rotational speed A (step S5). The ECU 100 executes the downshift (step S6). The ECU 100 executes an increase process for increasing the engine speed to the rotational speed B (step S7). In this case, the engine speed is increased to the rotational speed B by the power running operation in the first MG 14 while restricting the fuel cut. Further, the fuel injection amount and the intake air amount of the engine 10 are controlled to minimum values at which combustion in the engine 10 is continued.

Figure 4:
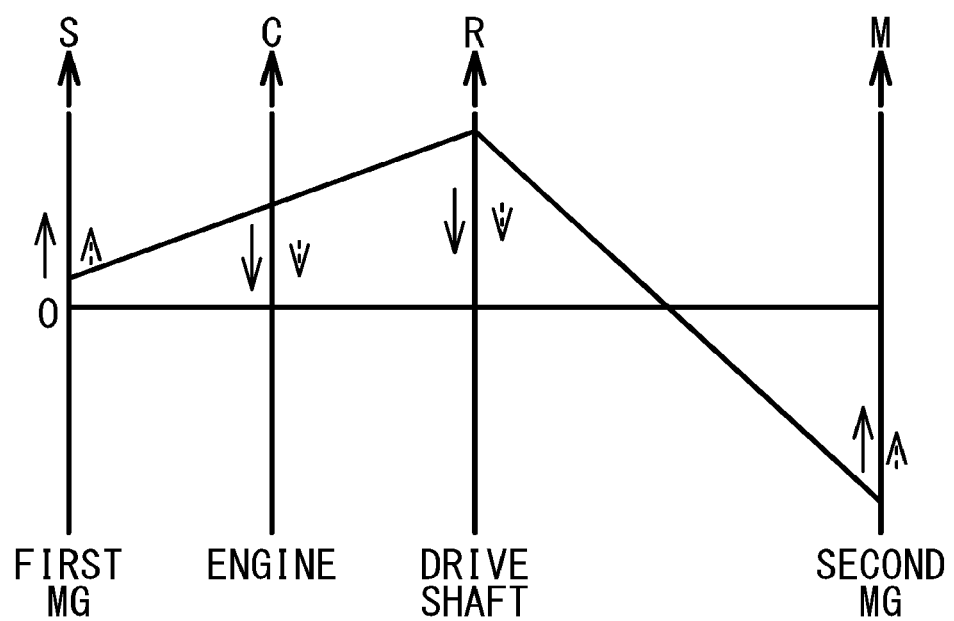
FIG. 4 is an alignment chart that defines the relationship among the rotational speeds of a first MG, the engine, the drive shaft, and a second MG.

FIG. 4 is an alignment chart that defines a relationship among the rotational speeds of the first MG 14, the engine 10, the drive shaft 53, and the second MG 15. An S-axis represents the rotational speed of the sun gear of the power split mechanism 50 and the rotational speed of the first MG 14. A C-axis represents the rotational speed of the planetary carrier of the power split mechanism 50 and the rotational speed of the engine 10. An R-axis represents the rotational speed of the ring gear of the power split mechanism 50 and the rotational speed of the drive shaft 53. An M-axis indicates the rotational speed of the second MG 15.

In each of the S-axis, the C-axis, and the R-axis, a value higher than zero indicates positive rotation. A value lower than zero indicates reverse rotation. An upward direction indicates a positive torque which is a torque in a positive rotation direction. A downward direction indicates a negative torque which is a torque in a reverse rotation direction. In the M-axis, a value higher than zero indicates reverse rotation. A value lower than zero indicates positive rotation. An upward direction indicates negative torque. A downward direction indicates positive torque. The alignment chart of FIG. 4 illustrates a state immediately after execution of the downshift. In FIG. 4, the magnitude of each torque during the stop of the decrease process is indicated by a solid line arrow, and the magnitude of each torque during the execution of the decrease process is indicated by a broken line arrow.

During the stop of the decrease process, the fuel cut is executed, so that the negative torque of the drive shaft 53 is ensured. Accordingly, the magnitude of the negative torque of the engine 10 is also large. The positive torque of the first MG 14 for increasing the engine rotational speed to the rotational speed A against the negative torque of the engine 10, that is, the power running torque is also controlled to be large.

On the other hand, during the execution of the decrease process, the fuel cut is restricted. Therefore, the deceleration of the hybrid vehicle 1 decreases, the negative torque of the drive shaft 53 decreases, and the magnitude of the negative torque of the engine 10 is small. The positive torque of the first MG 14 for increasing the engine rotational speed to the rotational speed B against the negative torque, that is, the power running torque is also controlled to be small. In this way, during the execution of the decrease process, the power running torque of the first MG 14 also decreases, and the power consumption of the first MG 14 is also suppressed. Therefore, electric power consumption in the hybrid vehicle 1 is suppressed. As a result, insufficient charging of the battery 18 is also prevented.

Figure 5:
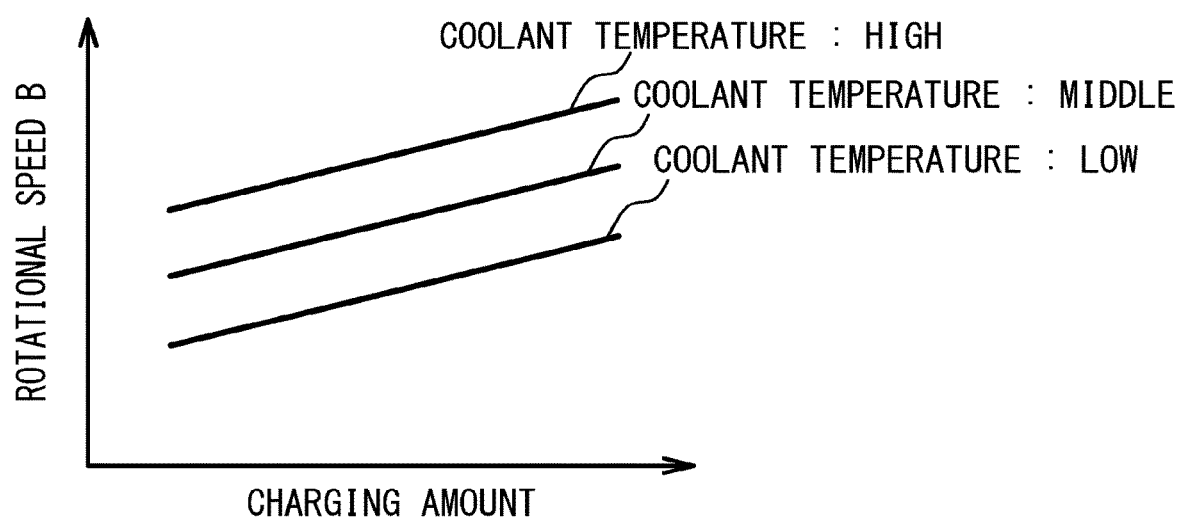
FIG. 5 is an example of a map that defines a rotational speed B.

Next, a method of setting the rotational speed B described above will be described. FIG. 5 is an example of a map that defines the rotational speed B. This map is defined in advance in the ROM of the ECU 100. The ECU 100 sets the rotational speed B with reference to this map. In the map of FIG. 5, the rotational speed B is set to a lower value, as the charge amount of the battery 18 is lower and as the temperature of the coolant is lower. By setting the rotational speed B to a lower value as the charge amount of the battery 18 is lower, the amount of power supplied from the battery 18 to the first MG 14 is suppressed to prevent insufficient charging of the battery 18. The charge amount of the battery 18 is detected by the SOC sensor 77.

A friction torque of the engine 10 increases as the temperature of the coolant decreases. Therefore, as the temperature of the coolant decreases, the power running torque of the first MG 14 for increasing the rotational speed of the engine 10 to a predetermined value increases, and the amount of electric power supplied to the first MG 14 also increases. Therefore, as illustrated in the map of FIG. 5, the rotational speed B is set to a lower value as the temperature of the coolant is lower. As a result, the electric power consumption in the hybrid vehicle 1 is suppressed. The temperature of the coolant is detected by the water temperature sensor 72.

In the example of FIG. 5, the rotational speed B is set so as to gradually decrease as the charge amount decreases, but is not limited thereto. The rotational speed B may be set so as to decrease stepwise. When the charge amount is equal to or less than a threshold value, the rotational speed B may be set to a lower value than when the charge amount is greater than the threshold value. Similarly, the rotational speed B is set so as to gradually decrease as the temperature of the coolant decreases, but is not limited to this. The rotational speed B may be set so as to decrease stepwise. The setting of the rotational speed B is not limited to the method based on such a map. The rotational speed B may be set by an arithmetic expression using the charge amount and the temperature of the coolant as arguments. Similarly to the rotational speed B, the rotational speed A may be set to a lower value as the charge amount of the battery 18 is lower and as the temperature of the coolant is lower.

In the above-described embodiment, as an example of the restriction of the fuel cut, the case where the fuel cut is restricted for all the cylinders 30 of the engine 10, that is, the case where the fuel injection is continued in all the cylinders 30 is described. However, the present disclosure is not limited thereto. For example, the fuel cut may be restricted to only some of the cylinders 30. In this case, fuel injection is continued in some cylinders 30, and the fuel cut is executed in the other cylinders 30. This is because, also in this case, the magnitude of the negative torque of the engine 10 when the engine rotational speed is increased to the rotational speed B by the first MG 14 at the time of deceleration of the downshift is small, as compared with the case where the fuel cut is executed for all the cylinders 30.

Although some embodiments of the present disclosure have been described in detail, the present disclosure is not limited to the specific embodiments but may be varied or changed within the scope of the present disclosure as claimed.

What is claimed is:
1. A hybrid vehicle comprising:
an engine coupled to a drive shaft;
a first motor that rotates the engine;
a second motor coupled to the drive shaft;
a transmission interposed between the engine and the first motor, and the second motor; and
a control device including a processor configured to execute a first decrease process and a second increase process,
wherein
the first decrease process is a process for decreasing deceleration of the hybrid vehicle by restricting fuel cut in the engine,
the second increase process is a process for increasing a rotational speed of the engine to a target rotational speed by power running torque of the first motor during deceleration by downshift of the transmission, and
a value of the target rotational speed in the second increase process is less during execution of the first decrease process than during stop of the first decrease process.
2. The hybrid vehicle according to claim 1, further comprising a battery that supplies electric power to the first motor,
wherein the target rotational speed in the second increase process decreases as a charge amount of the battery decreases.
3. The hybrid vehicle according to claim 1, wherein the target rotational speed in the second increase process decreases as a temperature of a coolant of the engine decreases.
4. The hybrid vehicle according to claim 1, wherein the first decrease process restricts the fuel cut when it is predicted that a temperature of a filter that collects particulate matter in exhaust gas of the engine excessively rises due to execution of the fuel cut.

\* \* \* \* \*